United States Patent
Huang et al.

(10) Patent No.: US 10,043,265 B2
(45) Date of Patent: Aug. 7, 2018

(54) SYSTEM, METHOD AND COMPUTER PROGRAM PRODUCT FOR IDENTIFYING FABRICATED COMPONENT DEFECTS USING A LOCAL ADAPTIVE THRESHOLD

(71) Applicant: KLA-Tencor Corporation, Milpitas, CA (US)

(72) Inventors: Tong Huang, Saratoga, CA (US); Xuguang Jiang, Milpitas, CA (US); Yong Zhang, Cupertino, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 0 days.

(21) Appl. No.: 15/221,542

(22) Filed: Jul. 27, 2016

(65) Prior Publication Data

US 2017/0270652 A1    Sep. 21, 2017

Related U.S. Application Data

(60) Provisional application No. 62/309,613, filed on Mar. 17, 2016.

(51) Int. Cl.
  *G06T 7/00*           (2017.01)
(52) U.S. Cl.
  CPC .... *G06T 7/001* (2013.01); *G06T 2207/30148* (2013.01)
(58) Field of Classification Search
  CPC ..................... G06T 2207/30148; G06T 7/001
  See application file for complete search history.

(56) References Cited

U.S. PATENT DOCUMENTS

| 8,126,255 | B2 | 2/2012 | Bhaskar et al. |
| 9,317,914 | B2 * | 4/2016 | Kitai ..................... G06T 7/0002 |
| 9,342,898 | B2 * | 5/2016 | Kitai ....................... G06T 7/408 |
| 9,544,447 | B2 * | 1/2017 | Shijoh .................. G06K 15/025 |
| 2003/0007677 | A1 * | 1/2003 | Hiroi ....................... G06T 7/001 382/149 |
| 2008/0049219 | A1 | 2/2008 | Kim et al. |
| 2008/0100844 | A1 | 5/2008 | Sali et al. |
| 2008/0112608 | A1 * | 5/2008 | Yang ....................... G06T 7/001 382/149 |
| 2011/0280470 | A1 | 11/2011 | Hayashi |
| 2012/0044486 | A1 * | 2/2012 | Chen ....................... H01L 22/12 356/237.5 |

(Continued)

OTHER PUBLICATIONS

International Search Report from PCT Application No. PCT/US2017/022736, dated Jun. 19, 2017.

*Primary Examiner* — Mia M Thomas
(74) *Attorney, Agent, or Firm* — Zilka-Kotab, PC

(57) ABSTRACT

A system, method, and computer program product are provided for identifying fabricated component defects using a local adaptive threshold. In use, images are received for target and reference components of a fabricated device. Additionally, a difference image is generated from the target and reference component images, and defect candidates for the target component are identified from the difference image. Further, for each of the identified defect candidates at a location in the difference image: a threshold is determined based on a local area surrounding the location of the defect candidate, and a signal at the location of the defect candidate is compared to the threshold to determine whether the defect candidate is a defect.

21 Claims, 5 Drawing Sheets

(56) References Cited

U.S. PATENT DOCUMENTS

| | | | |
|---|---|---|---|
| 2012/0114221 A1* | 5/2012 | Satou | G06T 7/001 382/149 |
| 2013/0016374 A1* | 1/2013 | Kawamoto | G03G 15/6585 358/1.9 |
| 2013/0044342 A1* | 2/2013 | Kaneko | B41J 2/2135 358/1.13 |
| 2013/0044347 A1* | 2/2013 | Kitai | H04N 1/4092 358/1.14 |
| 2013/0068947 A1 | 3/2013 | Nakamura et al. | |
| 2013/0250319 A1* | 9/2013 | Kaneko | G06K 9/03 358/1.9 |
| 2014/0036290 A1* | 2/2014 | Miyagawa | H04N 1/40 358/1.13 |
| 2014/0079292 A1* | 3/2014 | Kaneko | G06T 7/0002 382/112 |
| 2014/0079293 A1* | 3/2014 | Kitai | G06T 7/001 382/112 |
| 2015/0043804 A1 | 2/2015 | Huang et al. | |
| 2016/0104600 A1* | 4/2016 | Luo | G05B 19/401 250/310 |
| 2016/0140412 A1* | 5/2016 | Kolchin | G06K 9/40 382/260 |
| 2016/0321800 A1* | 11/2016 | Thattaisundaram | G06T 7/001 |
| 2017/0047195 A1* | 2/2017 | Lee | H01J 37/222 |

* cited by examiner

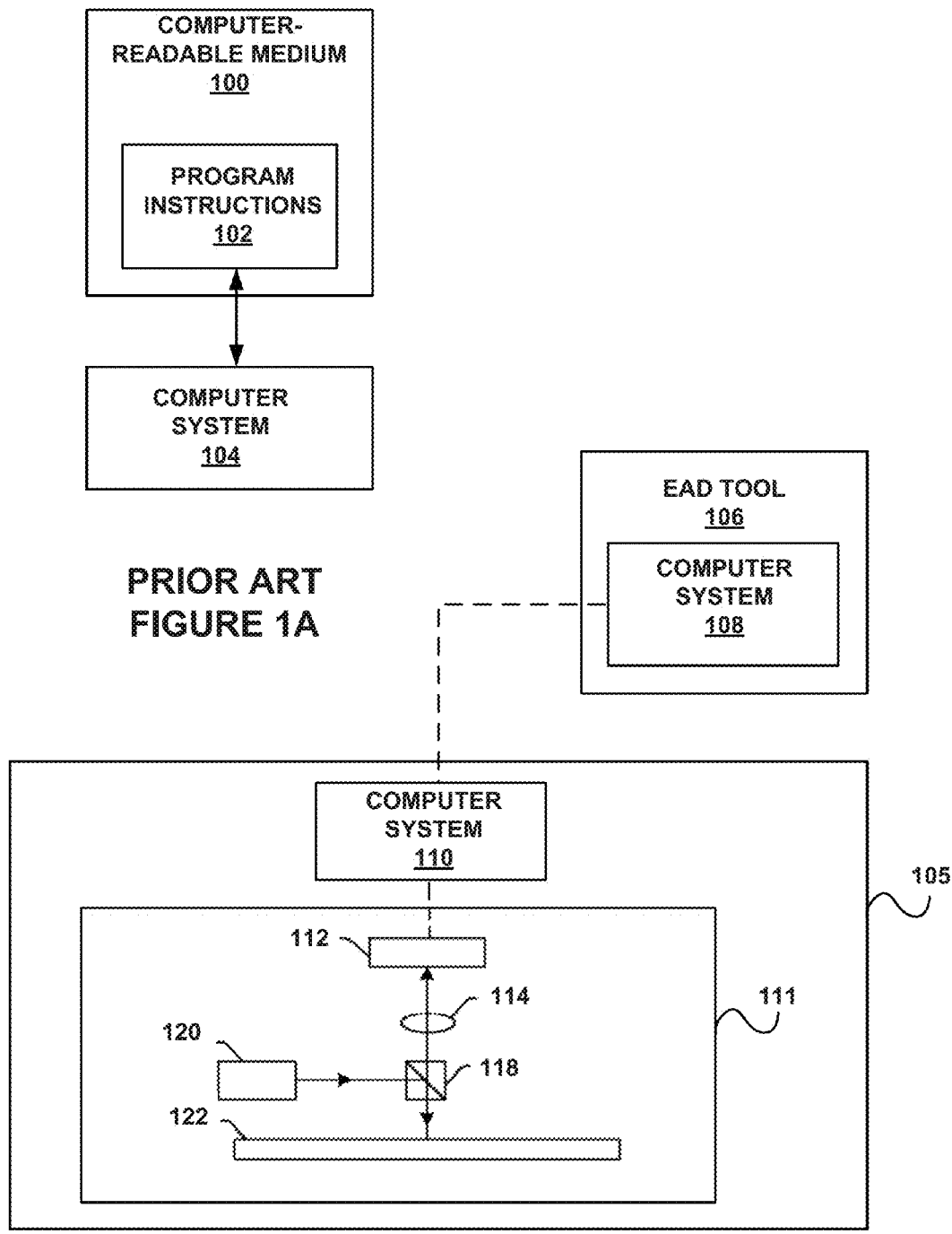
PRIOR ART
FIGURE 1A
PRIOR ART
FIGURE 1B

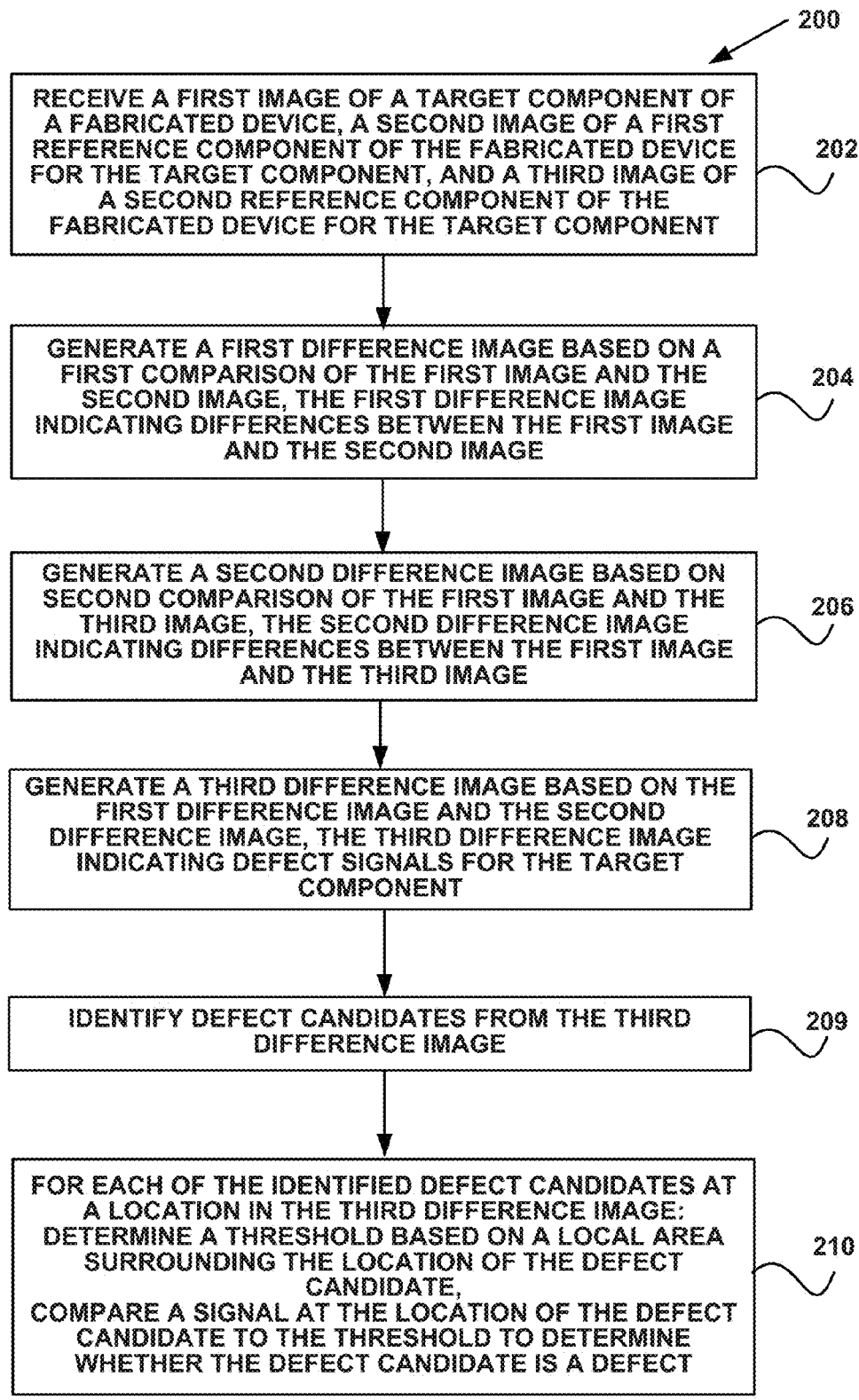
FIGURE 2

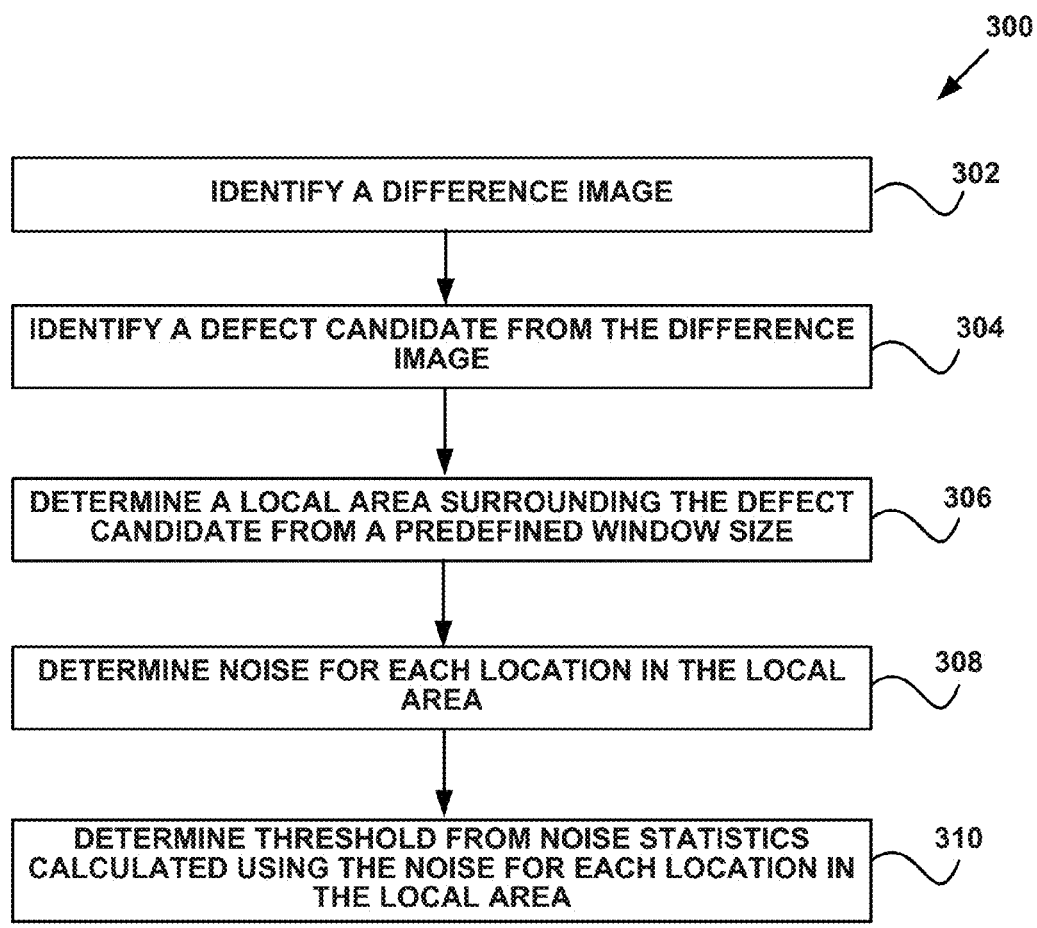
FIGURE 3

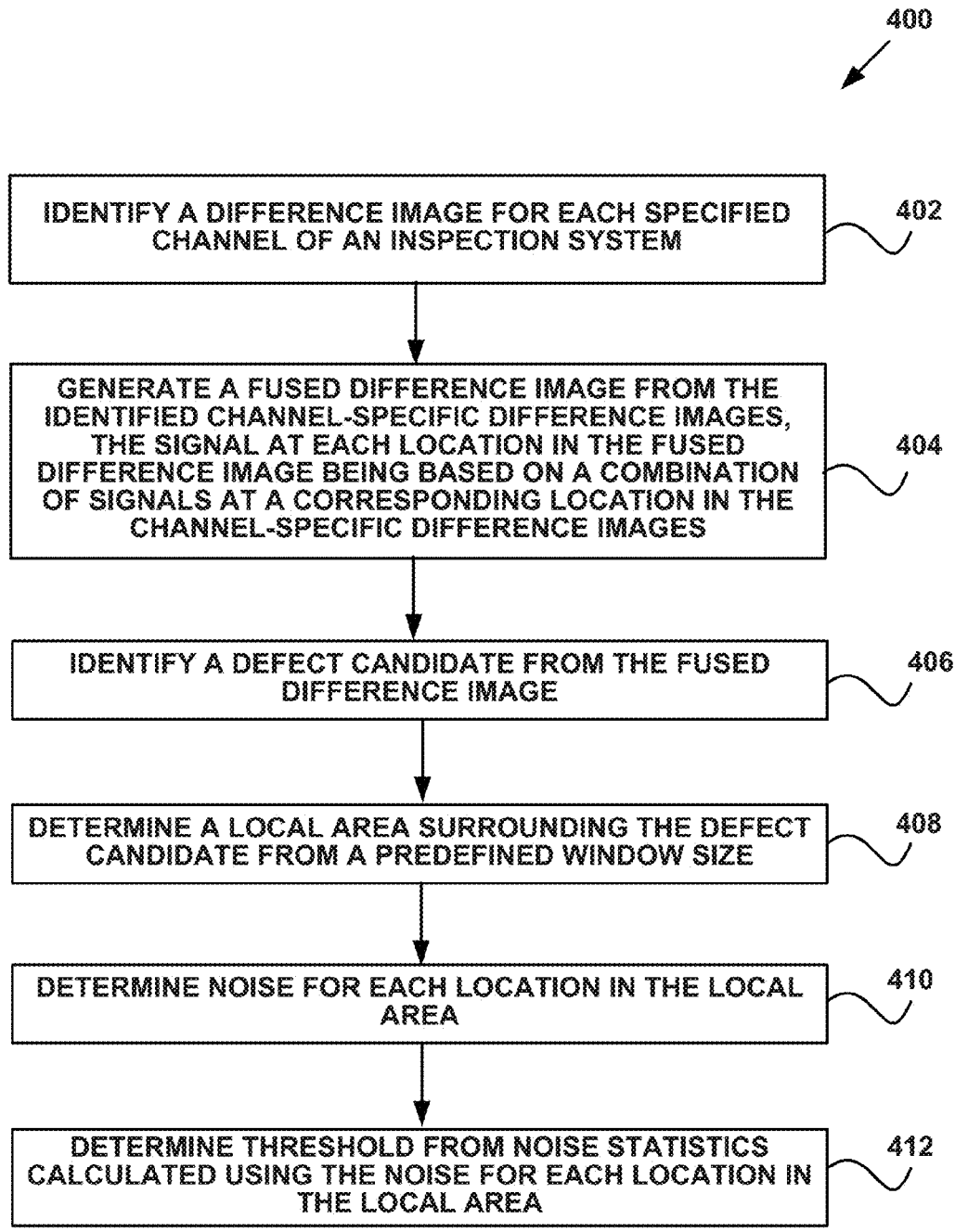
FIGURE 4

FIGURE 5

SYSTEM, METHOD AND COMPUTER PROGRAM PRODUCT FOR IDENTIFYING FABRICATED COMPONENT DEFECTS USING A LOCAL ADAPTIVE THRESHOLD

RELATED APPLICATION(S)

This application claims the benefit of U.S. Provisional Patent Application No. 62/309,613 filed Mar. 17, 2016, the entire contents of which are incorporated herein by reference.

FIELD OF THE INVENTION

The present invention relates to inspection of fabricated components, and more particularly to detecting defects in fabricated components.

BACKGROUND

Defect inspection plays a key role in yield management of semiconductor wafer processing for integrated circuit (IC) manufacturing. This may similarly be the case for other fabricated components. Identifying if there is a defect is based on wafer images obtained from optics systems.

Currently, defects in fabricated components (e.g. wafers) can be detected by comparing a target component (e.g. portion of a target die) of a fabricated device to reference components (e.g. corresponding portions of other reference dies) of the fabricated device, since oftentimes wafers are configured with repeating dies (i.e. having repeating patterns across the dies) at least in a same vicinity. For example, the reference dies may be adjacent, or otherwise closest in vicinity to, the target die. In general inspection systems accomplish this by taking images of the target and reference components for comparison purposes. For example, a laser scanner will scan a line of the wafer across a plurality of the dies to collect an image for that line. The inspection system will then take a piece of the image for a corresponding part of each of the target and reference dies.

Defects are then detected by performing two separate comparisons using the images to generate two separate results, one comparison being between the target component and one of the reference components and another comparison being between the target component and the other one of the reference components. A value combining those comparison results is generally used as a signal of a defect in the target component. This is often referred to as double detection.

Unfortunately, however, the target and reference component images include significant noise from systems and processes. This noise issue is one of the major problems for limiting sensitivity of the inspection system. Therefore, extracting noise statistics is critical for inspection algorithms. Existing inspection algorithms collect noise statistics across an entire region (care area groups). However, more and more inspection tools are adopted in logic regions with the design rule shrinking. Usually logic regions are so complicated in terms of design pattern that statistics for the entire region are not representative enough for a particular local area with a possible defect. This will limit inspection algorithm sensitivity.

There is thus a need for addressing these and/or other issues associated with the prior art techniques used for defect detection in fabricated components.

SUMMARY

A system, method, and computer program product are provided for identifying fabricated component defects using a local adaptive threshold. In use, a first image of a target component of a fabricated device is received, a second image of a first reference component of the fabricated device for the target component is received, and a third image of a second reference component of the fabricated device for the target component is received. Additionally, a first difference image is generated based on a first comparison of the first image and the second image, the first difference image indicating differences between the first image and the second image, a second difference image is generated based on a second comparison of the first image and the third image, the second difference image indicating differences between the first image and the third image, and a third difference image is generated based on the first difference image and the second difference image, the third difference image indicating defect signals for the target component. Defect candidates are identified from the third difference image. Further, for each of the identified defect candidates at a location in the third difference image: a threshold is determined based on a local area surrounding the location of the defect candidate, and a signal at the location of the defect candidate is compared to the threshold to determine whether the defect candidate is a defect.

BRIEF DESCRIPTION OF THE DRAWINGS

FIG. 1A shows a block diagram illustrating one embodiment of a non-transitory computer-readable medium that includes program instructions executable on a computer system for performing one or more of the computer-implemented methods described herein.

FIG. 1B is a schematic diagram illustrating a side view of one embodiment of an inspection system configured to detect defects on a fabricated device.

FIG. 2 illustrates a method for identifying fabricated component defects using a local adaptive threshold, in accordance with an embodiment.

FIG. 3 illustrates a method for determining a local adaptive threshold from information collected by a single channel of an inspection system, in accordance with an embodiment.

FIG. 4 illustrates a method for determining a local adaptive threshold from information collected by a plurality of channels of an inspection system, in accordance with an embodiment.

FIG. 5 illustrates a user interface for configuring settings used for identifying fabricated component defects, in accordance with an embodiment.

DETAILED DESCRIPTION

The following description discloses system, method, and computer program product are provided for identifying fabricated component defects using a local adaptive threshold. It should be noted that this system, method, and computer program product, including the various embodiments described below, may be implemented in the context of any integrated and/or separate computer and inspection system (e.g. wafer inspection, reticle inspection, laser scanning inspection systems, etc.), such as the ones described below with reference to FIGS. 1A-B.

An additional embodiment relates to a non-transitory computer-readable medium storing program instructions executable on a computer system for performing a computer-implemented method for identifying fabricated component defects using a local adaptive threshold. One such embodiment is shown in FIG. 1A. In particular, as shown in FIG. 1A, computer-readable medium 100 includes program instructions 102 executable on computer system 104. The computer-implemented method includes the steps of the method described below with reference to FIG. 2. The computer-implemented method for which the program instructions are executable may include any other operations described herein.

Program instructions 102 implementing methods such as those described herein may be stored on computer-readable medium 100. The computer-readable medium may be a storage medium such as a magnetic or optical disk, or a magnetic tape or any other suitable non-transitory computer-readable medium known in the art. As an option, computer-readable medium 100 may be located within computer system 104.

The program instructions may be implemented in any of various ways, including procedure-based techniques, component-based techniques, and/or object-oriented, techniques, among others. For example, the program instructions may be implemented using ActiveX controls, C++ objects, JavaBeans, Microsoft Foundation Classes ("MFC"), or other technologies or methodologies, as desired.

The computer system 104 may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer system 104 may also include any suitable processor known in the art such as a parallel processor. In addition, the computer system 104 may include a computer platform with high speed processing and software, either as a standalone or a networked tool.

An additional embodiment relates to a system configured to detect defects on a fabricated device. One embodiment of such a system is shown in FIG. 1B. The system includes inspection system 105 configured to generate output for a component being fabricated on a wafer (or other device), which is configured in this embodiment as described further herein. The system also includes one or more computer systems configured for performing the operations described below with reference to FIG. 2. The one or more computer systems may be configured to perform these operations according to any of the embodiments described herein. The computer system(s) and the system may be configured to perform any other operations described herein and may be further configured as described herein.

In the embodiment shown in FIG. 1B, one of the computer systems is part of an electronic automation design (EAD) tool, and the inspection system and another of the computer systems are not part of the EAD tool. These computer system may include, for example, the computer system 104 described above with reference to FIG. 1A. For example, as shown in FIG. 1B, one of the computer systems may be computer system 108 included in EAD tool 106. The EAD tool 106 and the computer system 108 included in such a tool may include any commercially available EAD tool.

The inspection system 105 may be configured to generate the output for the component being fabricated on a wafer by scanning the wafer with light and detecting light from the wafer during the scanning. For example, as shown in FIG. 1B, the inspection system 105 includes light source 120, which may include any suitable light source known in the art. Light from the light source may be directed to beam splitter 118, which may be configured to direct the light from the light source to wafer 122. The light source 120 may be coupled to any other suitable elements (not shown) such as one or more condensing lenses, collimating lenses, relay lenses, objective lenses, apertures, spectral filters, polarizing components and the like. As shown in FIG. 1B, the light may be directed to the wafer 122 at a normal angle of incidence. However, the light may be directed to the wafer 122 at any suitable angle of incidence including near normal and oblique incidence. In addition, the light or multiple light beams may be directed to the wafer 122 at more than one angle of incidence sequentially or simultaneously. The inspection system 105 may be configured to scan the light over the wafer 122 in any suitable manner.

Light from wafer 122 may be collected and detected by one or more channels of the inspection system 105 during scanning. For example, light reflected from wafer 122 at angles relatively close to normal (i.e., specularly reflected light when the incidence is normal) may pass through beam splitter 118 to lens 114. Lens 114 may include a refractive optical element as shown in FIG. 1B. In addition, lens 114 may include one or more refractive optical elements and/or one or more reflective optical elements. Light collected by lens 114 may be focused to detector 112. Detector 112 may include any suitable detector known in the art such as a charge coupled device (CCD) or another type of imaging detector. Detector 112 is configured to generate output that is responsive to the reflected light collected by lens 114. Therefore, lens 114 and detector 112 form one channel of the inspection system 105. This channel of the inspection system 105 may include any other suitable optical components (not shown) known in the art.

Since the inspection system shown in FIG. 1B is configured to detect light specularly reflected from the wafer 122, the inspection system 105 is configured as a BF inspection system. Such an inspection system 105 may, however, also be configured for other types of wafer inspection. For example, the inspection system shown in FIG. 1B may also include one or more other channels (not shown). The other channel(s) may include any of the optical components described herein such as a lens and a detector, configured as a scattered light channel. The lens and the detector may be further configured as described herein. In this manner, the inspection system 105 may also be configured for DF inspection.

The inspection system 105 may also include a computer system 110 that is configured to perform one or more steps of the methods described herein. For example, the optical elements described above may form optical subsystem 111 of inspection subsystem 105, which may also include computer system 110 that is coupled to the optical subsystem 111. In this manner, output generated by the detector(s) during scanning may be provided to computer system 110. For example, the computer system 110 may be coupled to detector 112 (e.g., by one or more transmission media shown by the dashed line in FIG. 1B, which may include any suitable transmission media known in the art) such that the computer system 110 may receive the output generated by the detector.

The computer system 110 of the inspection system 105 may be configured to perform any operations described herein. For example, computer system 110 may be configured for performing the defect detection as described herein. In addition, computer system 110 may be configured to perform any other steps described herein. Furthermore, although some of the operations described herein may be performed by different computer systems, all of the operations of the method may be performed by a single computer system such as that of the inspection system 105 or a stand alone computer system. In addition, the one or more of the computer system(s) may be configured as a virtual inspector such as that described in U.S. Pat. No. 8,126,255 issued on Feb. 28, 2012 to Bhaskar et al., which is incorporated by reference as if fully set forth herein.

The computer system 110 of the inspection system 105 may also be coupled to another computer system that is not part of the inspection system such as computer system 108, which may be included in another tool such as the EAD tool 106 described above such that computer system 110 can receive output generated by computer system 108, which may include a design generated by that computer system 108. For example, the two computer systems may be effectively coupled by a shared computer-readable storage medium such as a fab database or may be coupled by a transmission medium such as that described above such that information may be transmitted between the two computer systems.

It is noted that FIG. 1B is provided herein to generally illustrate a configuration of an inspection system that may be included in the system embodiments described herein. Obviously, the inspection system configuration described herein may be altered to optimize the performance of the inspection system as is normally performed when designing a commercial inspection system. In addition, the systems described herein may be implemented using an existing inspection system (e.g., by adding functionality described herein to an existing inspection system) such as the 29xx/28xx series of tools that are commercially available from KLA-Tencor. For some such systems, the methods described herein may be provided as optional functionality of the system (e.g., in addition to other functionality of the system). Alternatively, the system described herein may be designed "from scratch" to provide a completely new system.

FIG. 2 illustrates a method 200 for identifying fabricated component defects using a local adaptive threshold, in accordance with an embodiment. As shown in operation 202, a first image of a target component of a fabricated device is received, a second image of a first reference component of the fabricated device for the target component is received, and a third image of a second reference component of the fabricated device for the target component is received. In one embodiment, the fabricated device may be a wafer with repeating dies. In a further embodiment, the target component may be a portion of a first one of the dies, and the first and second reference components may be corresponding portions of second and third ones of the dies respectively. In this way, the target component and reference components may have like patterns.

Additionally, the first, second, and third images may be received from an inspection system, such as the inspection system described with reference to FIG. 1B above. For example, the inspection may collect the first, second, and third images from the target and reference components, respectively. These images may be collected using a single channel (e.g. collector) of the inspection system. Other embodiments are contemplated in which information from a plurality of channels of the inspection system is utilized for detecting defects, an example of which is described below with reference to FIG. 4.

As shown in operation 204, a first difference image is generated based on a first comparison of the first image and the second image, the first difference image indicating differences between the first image and the second image. Thus, the first difference image may represent differences between the target component and the first reference component.

Also, as shown in operation 206, a second difference image is generated based on a second comparison of the first image and the third image, the second difference image indicating differences between the first image and the third image. Thus, the second difference image may represent differences between the target component and the second reference component.

Then, as shown in operation 208, a third difference image is generated based on the first difference image and the second difference image, the third difference image indicating defect signals for the target component. For example, the third difference image may be generated by multiplying the first and second differenced images. In operation 209, defect candidates are identified from the third difference image. In an embodiment, all locations in the third difference image having at least a predefined minimum signal level may be determined to be defect candidates. In other words, when a signal of a pixel from the third image is larger than at least a predefined minimum amount, then the corresponding location in the third difference image may be identified as a defect candidate (i.e. a potential defect). This predefined minimum amount may be a default value or a value configured by a user. That location in the third difference image may have an intensity level determined as a function of the intensity level at each of the corresponding locations in the first and second difference images. Table 1 illustrates one example equation by which a defect signal is determined. Of course, the equation set forth in Table 1 is only set forth for illustrative purposes.

TABLE 1

Signal (x, y) = sqrt(|T(x, y) − R1(x, y)|*|T(x, y) − R2(x, y)|),
where T is the image of the target component,
R1 is the image of the first reference component,
R2 is the image of the first reference component, and
x, y is the location.

Still yet, as shown in operation 210, for each of the identified defect candidates at a location in the third difference image: a threshold is determined based on a local area surrounding the location of the defect candidate, and a signal at the location of the defect candidate is compared to the threshold to determine whether the defect candidate is a defect. Thus, a separate threshold may be determined for each defect candidate and then used to determine whether the defect candidate is a defect. In this way, the threshold of inspection may be adaptively changed based on a local noise level for the defect candidate.

In one embodiment, the local area may be determined using a predefined window size. The predefined window size may be a default value and/or may be configurable by a user. Thus, the local area may be of the predefined window size, and may further be centered on the defect candidate. In one exemplary embodiment, the predefined window size may be 33 by 33 pixels, or may be some function of a size of the defect candidate.

As noted above, the threshold is determined based on the local area surrounding the location of the defect candidate. The local area surrounding the location of the defect candidate may mean that the local area excludes the defect candidate. As a further option, the local area may surround a signal box centered on the defect candidate. A size of this signal box may be determined from a default value and/or may be configurable by a user. In one exemplary embodiment, the signal box size may be 7 by 7 pixels, or may be some function of the predefined window size mentioned above.

In one embodiment, the threshold may be determined as a function of noise statistics determined for the local area surrounding the location of the defect candidate. The noise statistics may be calculated as a function of an intensity level of each of the locations in the local area. This allows the noise statistics, and accordingly the threshold, to be specific to a neighboring area of the defect candidate. In this way, for example, a relatively quiet local area may result in a correspondingly low threshold, which will enable detection of weak defect signals in a relatively quiet local neighborhood. On the other hand, a relatively noisy local area may results in a correspondingly high threshold. One specific embodiment for calculating the noise statistics and, in turn the threshold, is described below with reference to FIG. 3.

As also noted above, once the threshold is determined, the signal (i.e. intensity value) at the location of the defect candidate is compared to the threshold to determine whether the defect candidate is a defect. An example of this signal is described above in Table 1. In an embodiment, when the signal meets or exceeds the threshold, the defect candidate may be identified as a defect. In another embodiment, when the signal is lower than the threshold, the defect candidate may not be identified as a defect (i.e. may be identified as non-defective).

FIG. 3 illustrates a method 300 for determining a local adaptive threshold from information collected by a single channel of an inspection system, in accordance with an embodiment. The method 300 may be carried out in the context of operation 210 in FIG. 2. Additionally, the above description may equally apply to the following embodiment.

As shown in operation 302, a difference image generated from images of a target component and reference components is identified. For example, the difference image may be the third difference image described above with reference to operation 208 in FIG. 2. From the difference image, a defect candidate is identified, as shown in operation 304. For example, for some signal at a location in the difference image, that signal may be identified as a defect candidate when it exceeds a predefined minimum signal level (e.g. see above in 209 of FIG. 2).

Next, as shown in operation 306, a local area surrounding the defect candidate (that is within the difference image) is determined from a predefined window size. In one embodiment, the local area may be of the predefined window size and may be centered on the defect candidate. The local area may exclude the defect candidate, or may further exclude a box of another predefined size surrounding the defect candidate. The predefined size of the box may therefore be smaller than the predefined window size for the local area.

Then, in operation 308, noise for each location in the local area is determined. The noise for each location in the local area may be defined as an intensity range corresponding to each pixel location in the local area, the intensity range being determined from of each corresponding pixel in the first, second, and third images. Table 2 illustrates an exemplary equation for determining noise at a particular location. Of course, this equation is set forth for illustrative purposes only and should not be construed as limiting in any manner.

TABLE 2

$Range(x, y) = max(T(x, y), R_1(x, y), R_2(x, y)) - min(T(x, y), R_1(x, y), R_2(x, y))$
where T is the defect candidate,
$R_1$ is the first reference image,
$R_2$ is the second reference image, and
x, y is the location.

In particular, in the equation shown in Table 2, the intensity range at a particular location in the local area for the defect candidate is defined as a difference between 1) a maximum signal value across corresponding locations in the image of the target component and the images of the reference components, and 2) a minimum signal value across those corresponding locations in the image of the target component and the images of the reference components.

Furthermore, as shown in operation 310, a threshold is determined from noise statistics calculated using the noise determined in operation 308. The noise statistics may be a function of the intensity range corresponding to each location in the local area. In the present embodiment, the noise statistics may include the mean noise determined for the locations in the local area and the standard deviation for the noise. The threshold may be determined as a function of the noise statistics. Table 3 illustrates an equation by which the threshold may be determined. Again, this equation is set forth for illustrative purposes only and should not be construed as limiting in any manner.

TABLE 3

$Th = \mu Range + L \cdot \sigma Range$,
where Th is the threshold,
μRange is the mean of the Range determined for each location in the local area (see Table 2),
L is a predefined value (e.g. configurable by a user) which may be defined as a number of standard deviations from the mean, and
σRange is the standard deviation of the Range determined for each location in the local area (see Table 2).

To this end, the method 300 provides an embodiment for determining a local adaptive threshold from information collected by a single channel of an inspection system. In another embodiment, a threshold may be determined from information collected by a plurality of channels of the inspection system. FIG. 4 illustrates a method 400 for determining a local adaptive threshold from information collected by a plurality of channels of an inspection system, in accordance with an embodiment. It should be noted that the above description may equally apply to the following embodiment.

In operation 402, a difference image is identified for each specified channel of an inspection system. For example, each of these difference images may be the third difference image described above with reference to operation 208 in FIG. 2. However, in the present description, the difference image for each specified channel is one generated from images of target and reference components that have been collected using that channel. These identified difference images may hereinafter be referred to as channel-specific difference images. Further, each of the channels may be located at a different position within the inspection system for inspecting the fabricated device from the different position (e.g. angle, etc.). As an option, the channels of the inspection system that are utilized for the present method 400 may be user configurable (see item 507 in FIG. 5), and thus specified by a user In operation 404, a fused difference image is generated from the channel-specific difference images identified in operation 402, with the signal (hereinafter fused signal) at each location in the fused difference image being based on a combination of signals at a corresponding location in the channel-specific difference images. In one exemplary embodiment involving a fused difference image generated from information from two channels, the fused signal at each location may be calculated as the square root of the product of the single channels' signal. While the present embodiment only describes a fused difference image generated from information collected from two channels, it should be noted that in other embodiments any number of additional channels may be utilized. For example, in the case of three channels, the fused signal at a particular location (x,y) in the fused difference image may be the cubic root of the product of the signals at the particular location (x,y) across the difference images determined from the three channels.

From the fused difference image, a defect candidate is identified, as shown in operation 406. For example, for some fused signal at a location in the fused difference image, that fused signal may be identified as a defect candidate when it exceeds a predefined minimum signal level. This predefined minimum signal level may be user configurable (e.g. see Abs Min of Channel Fusion LAT in FIG. 5).

Next, as shown in operation 408, a local area surrounding the defect candidate (that is within the fused difference image) is determined from a predefined window size. In one embodiment, the local area may be of the predefined window size and may be centered on the defect candidate. The local area may exclude the defect candidate, or may further exclude a box of another predefined size surrounding the defect candidate. The predefined size of the box may therefore be smaller than the predefined window size for the local area.

Then, in operation 410, noise for each location in the local area is determined. The noise at a particular location in the local area of the fused difference image may be determined by combining the noise of corresponding locations in the channel-specific difference images (e.g. described in 308 of FIG. 3). Table 4 illustrates an equation for combining, for a particular location, noise determined with respect to each specified channel of the inspection system. The equation set forth in Table 4 is for illustrative purposes only, such that it should be noted that the noise may optionally be combined in other ways.

TABLE 4

$Range_{ch12} = \sqrt{Range_{ch1} \cdot Range_{ch2}}$
where $Range_{ch12}$ is the combined noise at a particular location with respect
to two different channels of the inspection system,
$Range_{ch1}$ is the noise at the particular location determined with respect to one of the channels (e.g. calculated using the equation shown in Table 2), and
$Range_{ch2}$ is the noise at the particular location determined with respect to a
second one of the channels (e.g. calculated using the equation shown in Table 2).

While the present embodiment only describes combining noise with respect to two channels, it should be noted that in other embodiments noise determined with respect to any number of additional channels may be similarly combined. For example, in the case of three channels, the combined noise may be the cubic root of the product of the noise determined at a particular location with respect to each of the three channels.

Once the noise is determined in operation 410 for each of the locations in the local area of the defect candidate, the threshold is then determined from noise statistics calculated from that noise (see operation 412). This threshold can be determined by applying the equation in Table 3 to the noise determined in operation 410, and further the threshold can then be applied to the fused signal of the defect candidate in the fused difference image, for example as described above with reference to FIG. 2.

FIG. 5 illustrates a user interface 500 for configuring settings used for identifying fabricated component defects, in accordance with an embodiment. The user interface 500 may be implemented in the context of the descriptions of FIGS. 2-4, including the descriptions above with reference to a user interface. For example, the user interface 500 may be utilized by a user to configure the settings prior to the executing the method 300 described above with respect to FIG. 3. Yet again, it should be noted that the definitions above may equally apply to the following description.

The user interface 500 includes options for a user to configure parameters for defect detection performed with respect to individual channels 501 and channel combinations 507 as desired. For each of the individual channels 501 and channel combinations 507, the user interface 500 includes an execution option 506 ("Run"), which upon selection by the user enables defect detection using that individual channel 501 and/or channel combination 507.

For each of the individual channels 501 and channel combinations 507, the user interface 500 also allows the user to define a threshold 502 (i.e. L in Table 3) and an absolute minimum 504 (i.e. a predefined minimum level of difference required for target and reference component images). Threshold 502 may be empirically determined.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium storing a computer program product having code executable by a computer processor to perform a method comprising:

receiving a first image of a target component of a fabricated device, a second image of a first reference component of the fabricated device for the target component, and a third image of a second reference component of the fabricated device for the target component;

generating a first difference image based on a first comparison of the first image and the second image, the first difference image indicating differences between the first image and the second image;

generating a second difference image based on a second comparison of the first image and the third image, the second difference image indicating differences between the first image and the third image;

generating a third difference image based on the first difference image and the second difference image, the third difference image indicating defect signals for the target component;

identifying defect candidates from the third difference image;

for each of the identified defect candidates at a location in the third difference image:

determining a threshold based on a local area surrounding the location of the defect candidate,
comparing a signal at the location of the defect candidate to the threshold to determine whether the defect candidate is a defect.

2. The non-transitory computer readable medium of claim 1, wherein the fabricated device is a wafer with repeating dies.

3. The non-transitory computer readable medium of claim 2, wherein the target component is a portion of a first one of the dies and the first and second reference components are corresponding portions of second and third ones of the dies respectively.

4. The non-transitory computer readable medium of claim 1, wherein the first, second, and third images are received from an inspection system.

5. The non-transitory computer readable medium of claim 1, wherein all locations in the third image having at least a predefined minimum signal level are determined to be defect candidates.

6. The non-transitory computer readable medium of claim 5, wherein the minimum signal level is predefined by a user.

7. The non-transitory computer readable medium of claim 5, wherein the minimum signal level is predefined as a default value.

8. The non-transitory computer readable medium of claim 1, wherein the local area is determined using a predefined window size.

9. The non-transitory computer readable medium of claim 8, wherein the local area is centered on the defect candidate.

10. The non-transitory computer readable medium of claim 8, wherein the predefined window size is configurable by a user.

11. The non-transitory computer readable medium of claim 1, wherein the local area excludes the defect candidate.

12. The non-transitory computer readable medium of claim 11, wherein the local area surrounds a signal box centered on the defect candidate.

13. The non-transitory computer readable medium of claim 12, wherein a size of the signal box is user configurable.

14. The non-transitory computer readable medium of claim 1, wherein the threshold is determined as a function of noise statistics determined for the local area surrounding the location of the defect candidate.

15. The non-transitory computer readable medium of claim 14, wherein the noise statistics are determined as a function of an intensity range corresponding to each location in the local area, the intensity range being determined from of each corresponding location in the first, second, and third images.

16. The non-transitory computer readable medium of claim 1, wherein the first, second, and third images are collected by a single channel of an inspection system.

17. The non-transitory computer readable medium of claim 16, further comprising:
for at least one additional channel of the inspection system:
repeating the receiving of the first, second, and third images collected by the additional channel, and
repeating the generating of the first difference image, second difference image, and third difference image using the first, second, and third images collected by the additional channel;
generating a fused difference image from the third difference image generated for the single channel and the third difference image generated for the additional channel, a signal at each location in the fused difference image being based on a combination of signals at a corresponding location in the third difference image generated for the single channel and the third difference image generated for the additional channel;
identifying defect candidates from the fused difference image;
for each of the identified defect candidates at a location in the fused difference image:
determining a threshold based on a local area surrounding the location of the defect candidate in the fused difference image,
comparing a signal at the location of the defect candidate in the fused difference image to the threshold to determine whether the defect candidate in the fused difference image is a defect.

18. The non-transitory computer readable medium of claim 1, wherein comparing the signal at the location of the defect candidate to the threshold to determine whether the defect candidate is a defect includes:
when the signal at the location of the defect candidate exceeds the threshold, identifying the defect candidate as a defect, and
when the signal at the location of the defect candidate is lower the threshold, identifying the defect candidate as a non-defect.

19. A method comprising:
receiving, by a computer processor, a first image of a target component of a fabricated device, a second image of a first reference component of the fabricated device for the target component, and a third image of a second reference component of the fabricated device for the target component;
generating, by the computer processor, a first difference image based on a first comparison of the first image and the second image, the first difference image indicating differences between the first image and the second image;
generating, by the computer processor, a second difference image based on a second comparison of the first image and the third image, the second difference image indicating differences between the first image and the third image;
generating, by the computer processor, a third difference image based on the first difference image and the second difference image, the third difference image indicating defect signals for the target component;
identifying, by the computer processor, defect candidates from the third difference image;
for each of the identified defect candidates at a location in the third difference image:
determining, by the computer processor, a threshold based on a local area surrounding the location of the defect candidate,
comparing, by the computer processor, a signal at the location of the defect candidate to the threshold to determine whether the defect candidate is a defect.

20. The method of claim 19, wherein the method is performed by an inspection system that includes the computer processor.

21. An inspection system, comprising:
at least one collector for:
collecting a first image of a target component of a fabricated device, a second image of a first reference component of the fabricated device for the target component, and a third image of a second reference component of the fabricated device for the target component;
a computer processor for:
generating a first difference image based on a first comparison of the first image and the second image, the first difference image indicating differences between the first image and the second image;
generating a second difference image based on a second comparison of the first image and the third image, the second difference image indicating differences between the first image and the third image;
generating a third difference image based on the first difference image and the second difference image, the third difference image indicating defect signals for the target component;
identifying defect candidates from the third difference image;
for each of the identified defect candidates at a location in the third difference image:
determining a threshold based on a local area surrounding the location of the defect candidate,
comparing a signal at the location of the defect candidate to the threshold to determine whether the defect candidate is a defect.

* * * * *